United States Patent [19]

Mayer et al.

[11] Patent Number: 4,742,621
[45] Date of Patent: May 10, 1988

[54] SAFETY DEVICE ON A QUILL

[75] Inventors: Manfred Mayer, Schramberg; Gerhard Band, Oberndorf, both of Fed. Rep. of Germany

[73] Assignee: Mauser-Werke Oberndorf GmbH, Fed. Rep. of Germany

[21] Appl. No.: 940,776

[22] Filed: Dec. 12, 1986

[30] Foreign Application Priority Data

Dec. 20, 1985 [DE] Fed. Rep. of Germany ....... 3545330

[51] Int. Cl.$^4$ .............................................. G01B 7/28
[52] U.S. Cl. .................................................... 33/561
[58] Field of Search ............ 33/172 E, 172 D, 169 C, 33/172 R, 169 R, 561, 558

[56] References Cited

U.S. PATENT DOCUMENTS 4,270,275 6/1981 McMurtry ........................ 33/172 E
4,279,080 7/1981 Nakaya ............................. 33/172 E
4,679,326 7/1987 Takizawa et al. ................. 33/172 E Primary Examiner—William D. Martin, Jr.
Attorney, Agent, or Firm—McGlew and Tuttle

[57] ABSTRACT

A safety device on a quill with a sensing head fixably connected thereto interrupts a positioning motion of the quill in case of a collision of the sensing head. For this purpose there is fastened to the quill a mounting plate 6, on which rests a bearing plate on at least three balls 20. The sensing head is fixable to the bearing plate. Several switches and switching cams assigned to them are offset relative to the balls on the bearing plate. In case of a collision of the sensing head, the bearing plate is deflected relative to the mounting plate, thereby causing at least one switch to interrupt the driving motion of the quill.

11 Claims, 4 Drawing Sheets

SAFETY DEVICE ON A QUILL

FIELD AND BACKGROUND OF THE INVENTION

The invention relates in general to sensing devices and in particular to a new and useful safety device on a quill with a sensing head which can be attached to it, the safety device interrupting the movement of the quill in case of a collision of the sensing head.

If a quill of a measuring machine with a sensing head is moved towards the workpiece to be measured, it is not impossible for the quill to collide with an object in its travel. Especially at high travel speeds, e.g. 80 to 100 mm/s or more, it is important for a safety device to respond with very short time delay in case of such a collision in order to avoid a shift of or damage to the quill. Such a safety device is described in the older patent application No. P 35 26 633.3.

In the event that the sensing head itself collides in its travel, the deflection of its respective sensing finger occurring thereby is utilized to stop or reverse the travel motion. At high travel speeds this is hardly possible because the possible deflection of the sensing fingers would then have to be correspondingly great. Such an amplification of the deflection of sensing heads is not achievable off-hand.

SUMMARY OF THE INVENTION

The invention provides a safety device which interrupts a quill motion if the sensing head hits an object at high travel speed.

According to the invention, the safety device includes a mounting plate which is fastened to the quill. A bearing plate rests on the mounting plate over at least three balls distributed over the circumference. The sensing head can be fixed to the bearing plae and at least two switches are provided on the one plate and switching cams for the switches on the other plate.

If, in its travel, the sensing head hits an object, the bearing plate supporting the sensing head will move relative to the mounting plate, in which process at least one of the two switches will be actuated immediately, switching off continued motion of the quill or reversing its motion into the opposite direction. It is also advantageous here that the possible deflection of the fingers of the sensing head does not structurally have to be enlarged for this purpose.

What is also achieved by the loose mounting of the bearing plate of the mounting plate is that the safety device responds in the same manner to collisions in +−x, ty−, −y− direction and in +z− direction.

Also, the ball mounting makes certain that, after the collision, the bearing plate returns naturally, under the weight of the sensing heads, into its position aligned with the mounting plate.

These springs are preferably extension springs active between the bearing plate and the mounting plate.

Provided between the quill and the sensing head is an electrical plug connection to connect the sensing head, closing automatically when attaching the sensing head to the quill. To avoid that this plug connection interferes with the deflection of the sensing head in case of a collision, a preferred embodiment of the invention provides that the part of the plug connection attached to the quill is fastened to a strip fixed to a quill holding means, when the sensing head is not attached to the quill, and automatically disengaging from the holding means after plugging in the part of the plug connection fastened to the sensing head when attaching the sensing head.

Accordingly it is an object of the invention to provide a safety device on a quill which has a sensing head which is flexibly connected to the quill in an arrangement where the quill is driven in a positioning motion and in which a collision of the sensing head occurs and which includes a mounting plate having a bearing plate mounted thereon over at least three widely spaced support balls and wherein the sensing head is fixable to the bearing plate and which includes several switches and switching cams carried by the plate and offset relative to the balls so that when collision of the sensing head occurs the bearing plate is deflected relative to a mounting plate causing at least one switch to be contacted by the cams and interrupt the driving motion of the quill.

A further object of the invention is to provide a safety support construction for a sensing head relative to its quill which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
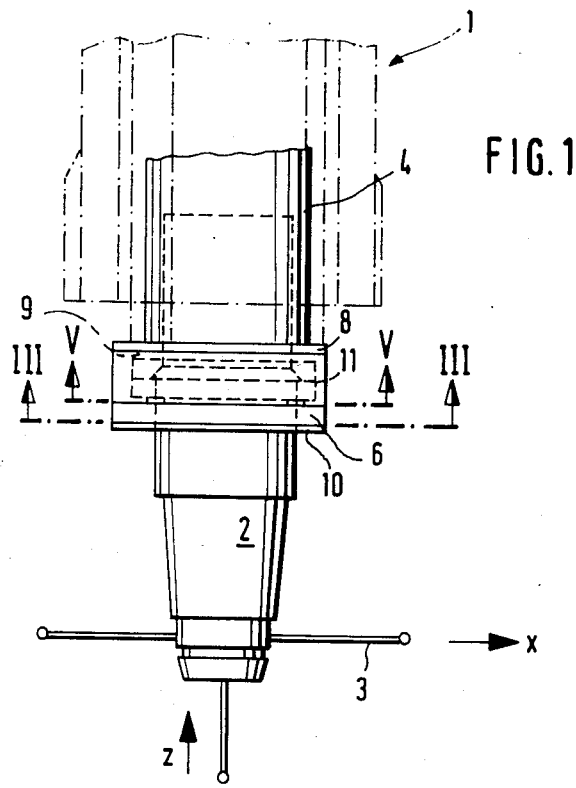
FIG. 1 is an elevational view of a quill with sensing head constructed in accordance with the invention.

Referring to the drawings in particular the invention embodied therein comprises a safety device including actuating cams 28 which are carried on the bearing plate so that movement of the bearing plate relative to the mounting plate 6 causes actuation of the switches 27 by the cams to stop the movement of the quill in a particular drive direction.

Figure 3:
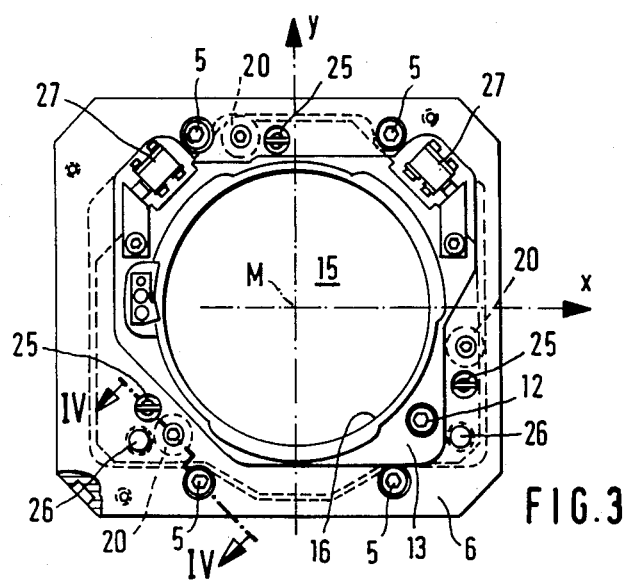
FIG. 3 is a view of the quill along line III—III of FIG. 1.
Figure 4:
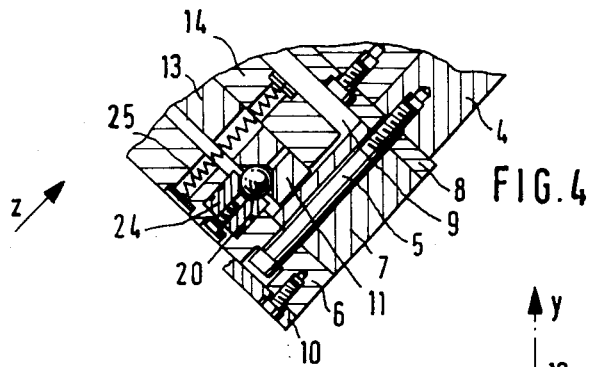
FIG. 4 is a view along line IV—IV of FIG. 3.

A sensing head 2 with feelers 3 is disposed at the lower end of a quill 1. The quill 1 has a supporting tube 4. At its bottom are fastened by means of threaded bolts 5 (see FIGS. 3,4) a mounting plate 6, a spacing ring 7 and a disc 8. The spacing ring 7 forms a free space 9 between the mounting plate 6 and the disc 8. A cover 10 is provided on the mounting plate 6.

In the free space lies a bearing plate 11 formed by partial plates 13 and 14 screwed together by screws 12.

Figure 2:
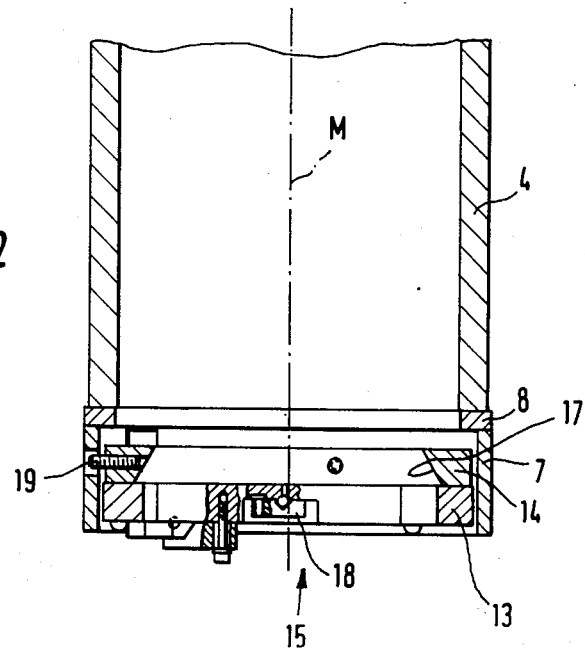
FIG. 2 is a sectioned view of the quill without a mounting plate.

The mounting plate 6, the disc 8, the cover 10 and the bearing plate 11 have a central hole 15 to push the sensing head 2 through. At the periphery of its central hole 15 the bearing plate 11 is designed as bayonet lock 16. To fix the sensing head 2 to the bearing plate 11 it is pushed through the hole 15 until it strikes a tapered surface 17 (see FIG. 2) of the partial plate 14. Then the sensing head 2 is turned by about 45° until it hits a stop 18 so that rim parts stand on the partial plate 13. Finally the sensing head 2 is secured by pressure screws 19 (see FIGS. 2 and 5).

Disposed on the bearing plate 11, especially on its partial plate 13, in hemispherical depressions 21, 22 and 23, are three balls 20 distributed over the circumference. The balls 20 are staggered by 120° on a circle around the center axis M. The balls are offset on the circle relative to the X-Y direction. For instance, the hemispherical depression 21 is offset by about 10° to 20° relative to the Y axis. Prism or Vees 24 (see FIG. 4) are provided on the mounting plate 6 for the accommodation of the balls 20.

Between the bearing plate 11 and the mounting plate 6 near the hemispherical depressions 21, 22, 23 or the associated Vees or prism extension springs 25 are disposed.

Figure 7:
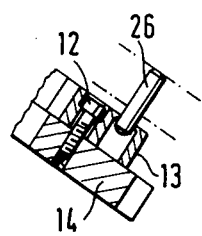
FIG. 7 is a view along line VII—VII of FIG. 5.

Two guide pins 26 (see FIG. 5 and 7) are provided between the mounting plate 6 and the bearing plate 11. They are positioned symmetrical to the Y axis and are equidistant from the X axis.

Figure 6:
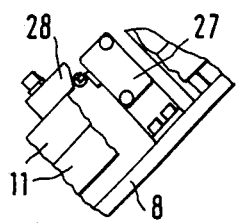
FIG. 6 is a view in the direction of arrow VI in FIG. 5.

Fastened to the disc 8, which is fixed to the quill like the mounting plate 6, are two switches 27. To each switch 27 is assigned a switching cam 28 (see FIGS. 5 and 6). The actuation points between the switches 27 and the switching cams 28 are symmetrical to the Y axis in mirror image and equidistant from the X axis, this distance approximating also the distance of the guide pins 26 from the X axis.

The device describes roughly as follows:

At rest, the bearing plate 11 (FIG. 4) is retained in adjustment on the mounting plate 6 by the balls 20 and the Vees prisms 24. The guide pins 26 prevent the bearing plate 11 from turning relative to the mounting plate 6, although the tendency to do so exists when attaching or detaching the sensing head 2. The balls 20 lie in Vees or prisms 24 under the weight of the sensing head 2 and also under the action of the extension spring 25.

If, in moving the quill 1 in X direction, the sensing head 2 strikes an obstruction, the bearing plate 11 experiences a tilt deflection about the ball 20 lying in the hemispherical depression 22, the balls 20 in the hemispherical depressions 21 and 23 rising slightly out of the associated prisms or Vees 24. This causes the switching cam 28 (FIG. 6) located between the hemispherical depressions 21 and 23 to switch the switch 27 assigned to it, the left one in FIG. 5. This, in turn, causes the quill drive to be shut off or reversed before the sensing head can be damaged.

Figure 5:
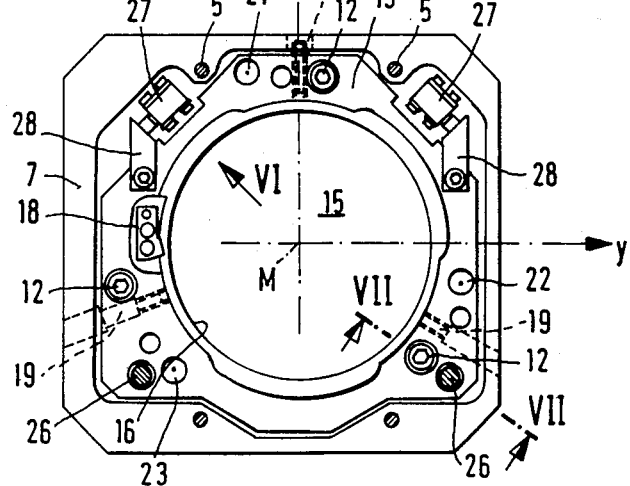
FIG. 5 is a view of the quill along line V—V of FIG. 1.

In case of a collision of the sensing head 2 in X direction, the bearing plate 11 is tilt-deflected bout the ball lying in the depression 23. Then the opposite switch 27, the right one in FIG. 5 is switched.

Figure 8:
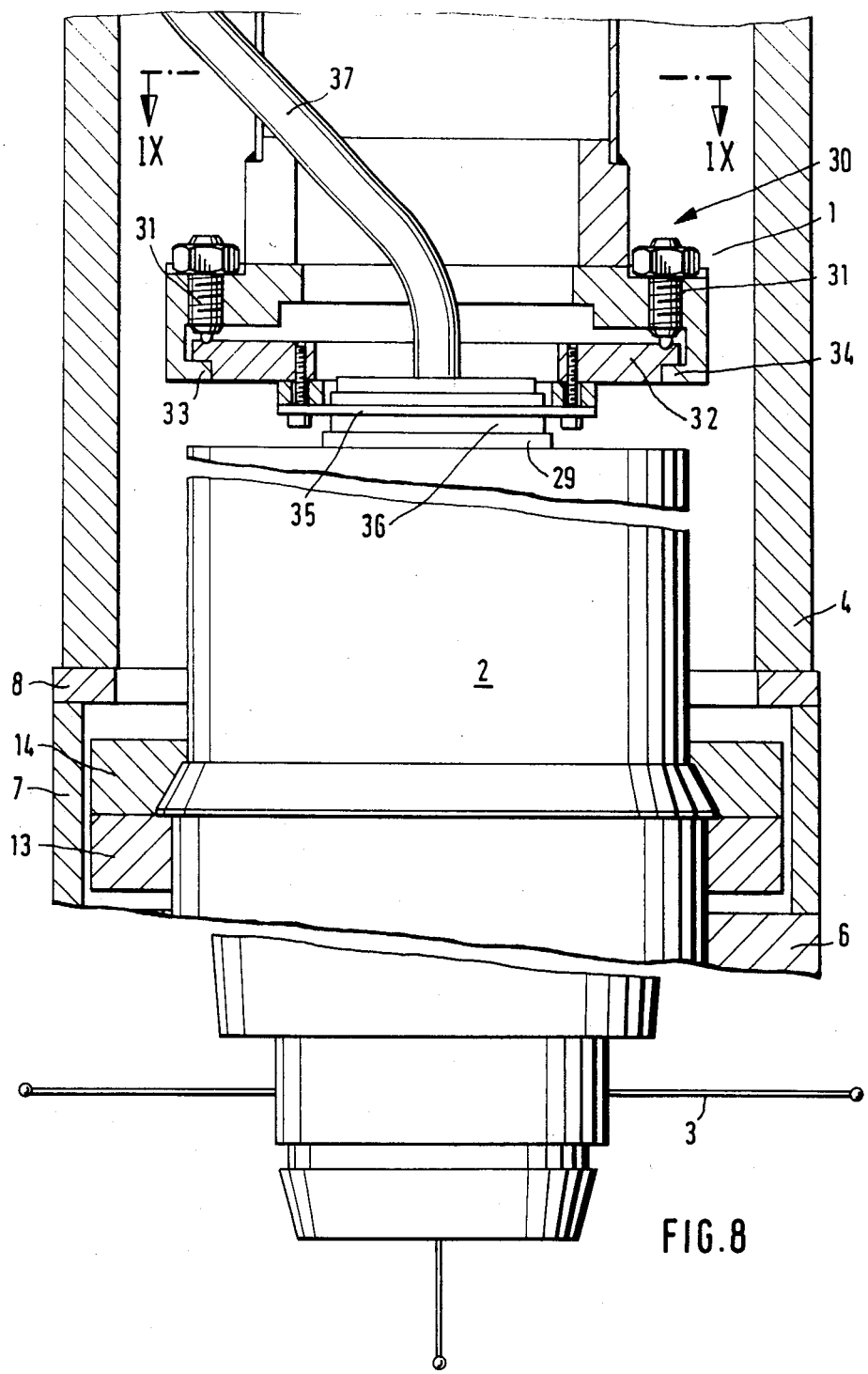
FIG. 8 is a sectional view similar to FIG. 2 of an electrical plug connection between the quill and the sensing head.

In case of a collision of the sensing head 2 in a Y direction, the bearing plate 11 tilts about a strip 32 on tongues 33 and 34 of the holding means 30 (FIG. 8). Fastened to the strip 32 by means of a yoke 35 is a plug 36 fitting the socket 29.

Figure 9:
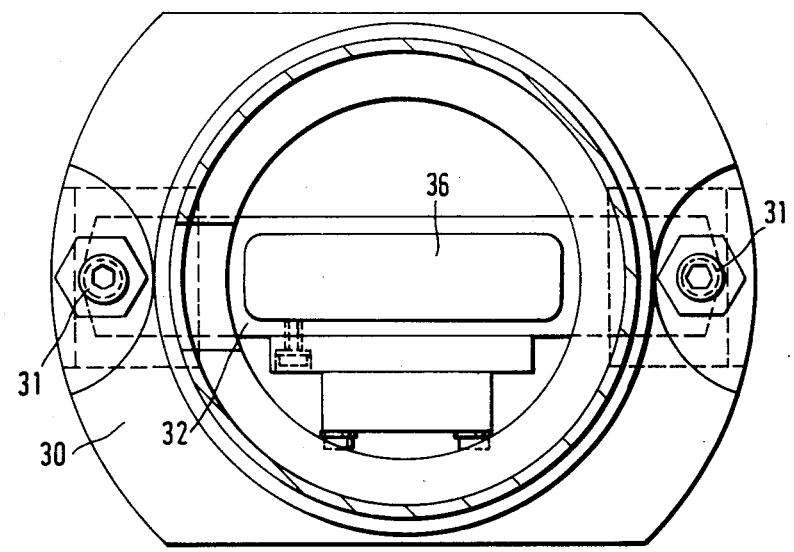
FIG. 9 is a view along line IX—IX of FIG. 8.

When sliding the sensing head 2 through the hole 15 into the quill 1, the socket 29 slides over the plug 36. If the sensing head 2 is subsequently turned by about 45° for locking (see FIG. 9), the strip 32 is detached from the compression spring elements 31 and the tongues 33, 34. In other words, it is in a free position and thus cannot interfere with tilt deflections occurring in the event of a collision. A cable 37 connected to the plug 37 does not disturb the tilt deflections. To remove the sensing head 2, it is turned in the opposite direction in the bayonet lock 16. In so doing, the strip 32 slides at the same time between the compression spring elements 31 and the tongues 33 and 34 again so that the plug 36, after removal of the sensing head 2, is immediately in the position again required for the subsequent attachment of a sensing head. While specific embodiments of the invention have been shown and described in detail to illustrate the application of the principles of the invention, it will be understood that the invention may be embodied otherwise without departing from such principles.

What is claimed is:

1. A safety device on a quill for stopping the positioning movement of the quill when a sensing head carried by the quill has a collision with an object, comprising, a quill, a sensing head which can be attached to said quill, a safety device carried between said quill and said sensing head for stopping the movement of said quill when the sensing head has a collision, including a mounting plate fastened to said quill, at least three balls distributed over the circumference of said mounting plate, a bearing plate resting on the balls of said mounting plate, said sensing head being fixable to said bearing plate, at least one quill movement actuation switch positioned adjacent said mounting plate, the switching cam for said at least one quill movement actuation switch offset relative to said balls on the circumference of said bearing plate and actuatable when said bearing plate is deflected relative to said mounting plate.

2. A safety device according to claim 1, including springs provided to bias said mounting plate toward said bearing plate.

3. A safety device according to claim 1, wherein said springs are active between said bearing plate and said mounting plate.

4. A safety device according to claim 1, wherein said bearing plate has recesses which are aligned with similar recesses in said mounting plate.

5. A safety device according to claim 1, wherein said sensing head has a bayonet lock portion defined on said bearing plate.

6. A safety device according to claim 1, including at least two guide pins extending between said mounting plate and said bearing plate.

7. A safety device according to claim 1, wherein said bearing plate comprises two separate partial plates.

8. A safety device according to claim 1, wherein said balls are staggered by 120° in a circle concentric with the central axis of said sensing head, but are offset relative to the X-Y direction.

9. A safety device according to claim 1 wherein there are a plurality of switches and a switching cam for actuating each switch arranged symmetrical to the Y-axis.

10. A safety device according to claim 1, including an electrical plug connection extending between said quill and said sensing head having a plug connection portion disposed on said quill, said quill having a strip member fastened to said plug connection, fixed holding means holding said strip when said sensing head is not attached to said quill and detaching from said holding means after said plug has a part connection fastened to said sensing head which has been plugged into said sensing head.

11. A safety device on a quill for stopping the positioning movement of the quill when a sensing head carried by the quill has a collision with an object, comprising, a quill, a sensing head which can be attached to said quill, a safety device carried between said quill and said sensing head for stopping the movement of said quill when the sensing head has a collision including a mounting plate fastened to said quill, at least three balls distributed over the circumference of said mounting plate, a bearing plate resting on the balls of said mounting plate, said sensing head being fixable to said bearing plate, a plurality of quill movement actuation switches positioned at spaced locations adjacent said mounting plate and each of said balls, at least one switching cam for each switch offset relative to said balls on the circumference of said bearing plate in a position to actuate an associated switch when said bearing plate is deflected relative to said mounting plate.

* * * * *